Aug. 18, 1959  P. B. GIFFORD  2,900,556
ELECTRODE POSITIONING DEVICE
Filed Nov. 12, 1957  2 Sheets-Sheet 1

INVENTOR.
PAUL B. GIFFORD
BY
James M. Ely
ATTORNEY

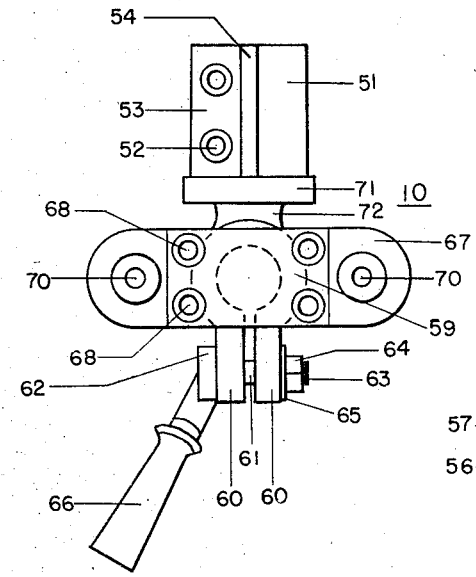

United States Patent Office 2,900,556
Patented Aug. 18, 1959

2,900,556

ELECTRODE POSITIONING DEVICE

Paul B. Gifford, Troy, N.Y., assignor to Allegheny Ludlum Steel Corporation, Brackenridge, Pa., a corporation of Pennsylvania Application November 12, 1957, Serial No. 695,796

7 Claims. (Cl. 314—69)

This invention relates to consumable electrode furnaces and in particular to new positioning and driving devices for such furnaces.

In the production and melting of metals and alloys the necessity of providing homogeneous uniform ingots varies with the type of metal, alloy and ultimate properties required. With some metals and alloys it is extremely difficult to obtain commercially pure metal ingots of uniform chemical analysis by conventional furnace melting and pouring methods. For example, reactive metals such as molybdenum, titanium, zirconium, uranium and alloys thereof must be melted under rigidly controlled atmospheric conditions and thus must be produced by arc melting in an atmosphere that is non-contaminating to the metal being melted, such atmosphere being an inert gas or a vacuum or partial vacuum or by sintering particulate material in a controlled atmosphere or by similar methods. The conventional melting practices frequently result in ingots that exhibit considerable alloy segregation and large quantities of non-metallic inclusions. Methods of remelting electrodes of these materials in order to secure uniformity of chemical analysis and to reduce the quantity of impurities inherent in the metals produced in a conventional manner are well known. The most common and commercially practical method developed consists of arc melting of electrodes prepared by more conventional means in a substantial vacuum. The method of vacuum remelting has been found to be highly advantageous in securing sound and uniform ingots substantially free of non-metallic inclusions and alloy segregation. This method is employed for the production of many metals and alloys as well as the aforementioned reactive metals. For example, the method is presently employed in securing sound steel ingots, particularly highly alloyed steels, stainless steels and superalloys both ferrous and non-ferrous.

Furnaces designed to effect vacuum electrode melting are generally composed of a vertically mounted ram to which is mounted the electrode to be remelted. The ram extends downwardly into a vacuum chamber and projects the electrode before it which is thus propelled into a vacuum sealed crucible where it is consumably arc melted. The size of the electrode, particularly the length, is relatively critical in that the electrode when inserted into the furnace must come to within a predetermined distance from the bottom of the crucible in order to properly strike an arc. Thus, electrodes for such use must all be of substantially the same predetermined length in order that they all fall within the proper spaced relationship to the bottom of the crucible to effect arc melting. Such a requirement is not only undesirable in compelling all metals to be formed into electrodes of standard lengths for such remelting but is also nearly impossible in that unsound metal must frequently be cropped from the ends of electrodes that are produced by conventional melting practices. The difficulty is overcome in part by the use of stubs or pedestals that are welded onto the end of the electrodes for connecting the electrode to the end of the ram. By varying the length of the stub or predestal, short electrodes taking longer pedestals and longer electrodes taking short pedestals, the length of the electrodes may be adjusted within a certain limited range. However, such an arrangement is highly inconvenient in that all electrodes must be fabricated to a given short length range, requiring certain critical sizes of molds for preparing electrodes. Also a large stock of stubs or pedestals of various lengths must be maintained. Further, care must be exercised to melt only the electrode and not melt the stub or pedestal.

It has now been found that by means of the present invention electrodes of nearly any length may be melted in a consumable electrode furnace without employing any variety of stub or pedestal length.

It is therefore the object of the present invention to provide a means of adjusting the position of the ram of a consumable electrode melting furnace so as to enable one to melt various length electrodes without providing compensating pedestals.

It is also an object of the present invention to provide a ram positioning and driving device that will enable one to melt varying size metal electrodes in a consumable elcetrode melting furnace.

A further object of the present invention is to provide a means for adjusting the position of the ram of a consumable electrode melting furnace in relation to the ram motivating force.

Other objects and advantageous features of the present invention will be obvious from the following description when taken in conjunction with the accompanying drawings, in which:

Fig. 4 is a view in elevation and greatly enlarged of the adjustable ram positioner 10 of the apparatus of Fig. 1.

Fig. 5 is a view in elevation and greatly enlarged of the ram positioning and driving device of the apparatus of Fig. 2; and Fig. 6 is a detailed top plan view of the ram positioner of Figs. 4 and 5.

In general, the present invention relates to a ram positioning and driving device. This device is composed of a slotted sleeve-like or C-shaped part positioned around the vertically positioned ram of a consumable electrode vacuum melting furnace. The sleeve is formed with two flanges, one on either side of the open area of the C. There is a cylindrical perforation in each flange. A bolt-like member projects through the perforations across the open area of the C and is threaded into a stationary retaining member on the side of one flange opposite the open area of the C or is threaded into threads cut within the flange perforation of the flange opposite that bearing on the head of the bolt-like member. The bolt-like member is provided with a handle that will rotate the member so that by moving the handle the bolt-like member rotates in one direction and the flanges are pulled together thus tightening the sleeve-like member on the ram. When the bolt-like member is rotated in the reverse direction pressure is released on the flanges, Thus, the positioning and driving device may be tightened to the ram enabling it to carry the ram along when the device is propelled vertically or it may be loosened so as to travel vertically independently of the ram. The device is preferably propelled vertically by at least one vertically mounted drive screw threaded to vertically mounted screw receptacles in the positioning and driving device. Rotation of the drive screws in one direction causes vertical movement downward and in the reverse direction causes vertical movement upward. Thus, it can be seen that the position of the ram in relation to the driving device may be adjusted in accordance with the length of the electrode and any size attachment stub or pedestal may be employed. The ram may be first positioned to project the electrode to the desired position in respect to the crucible by tightening the sleeve while rotating the drive screws to propel the ram to the desired direction. The sleeve may then be loosened to allow the driving device to be positioned to advance the electrode the desired distance.

Figure 1:
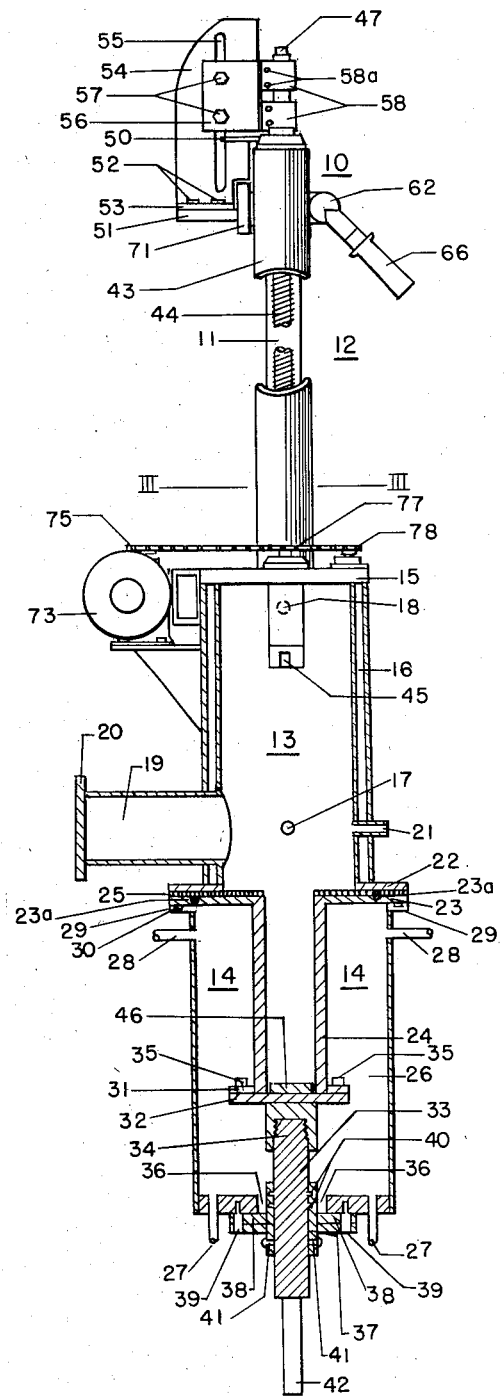
Figure 1 is an elevation view, partly in section, of a furnace structure embodying the teachings of this invention.
Figure 2:
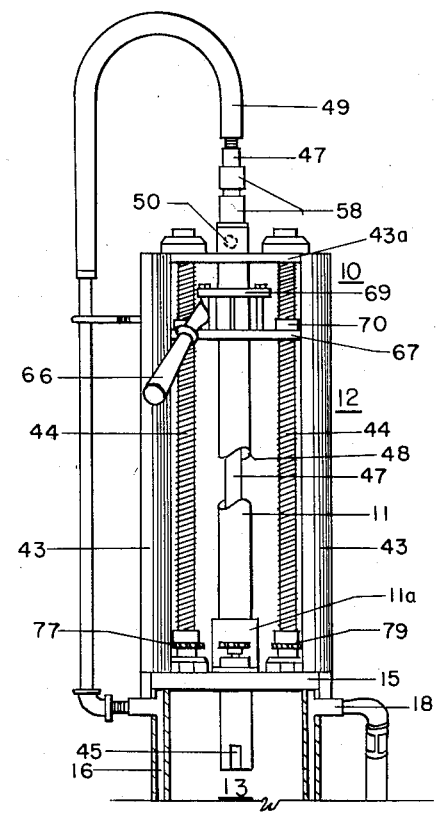
Fig. 2 is a view in elevation and partly in section of the upper portion of the structure of Fig. 1, the illustration of Fig. 2 being rotated 90° from the position shown in Fig. 1.
Figure 3:
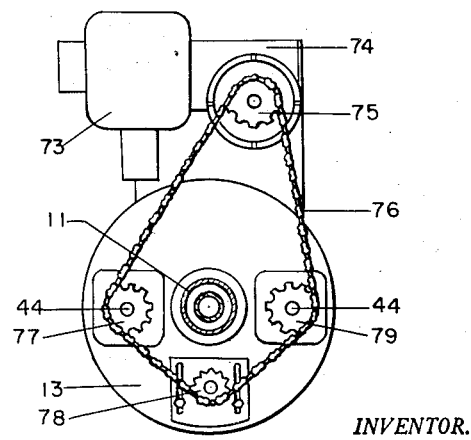
Fig. 3 is a top plan view, partly in section, of the structure of Fig. 1 as taken along the line III—III thereof.

Referring to the drawings there is illustrated a furnace and ram positioning and driving device as constructed and employed in accordance with the present invention. In Figs. 1, 2, 4, 5 and 6, the ram positioning and driving device is shown generally at 10. To more clearly understand and appreciate the construction and operation of device 10 it is necessary to understand the general construction and operation of the vacuum melting furnace as it is illustrated in Figs. 1, 2 and 3.

The furnace illustrated in Fig. 1 is composed of three main parts consisting of the ram and associated mechanism shown generally at 12, the vacuum chamber shown generally at 13 and the crucible mechanism shown generally at 14. The ram 11 projects downwardly into the vacuum chamber 13 through the top plate 15 of vacuum chamber 13. An O ring seal (shown generally at 11a in Fig. 2) surrounds the ram in the vicinity of top plate 15 and seals vacuum chamber 13 from air leakage about the ram. Vacuum chamber 13 is supplied with a water cooling jacket as is shown at 16. Cooling jacket 16 contains an inlet and an outlet for circulating water and controlling the temperature of the vacuum chamber during operation as shown at 17 and 18. Vacuum chamber 13 has a vacuum port shown at 19 with a flange 20 that is designed to receive a conventional vacuum hose (not shown) originating at a vacuum producing mechanism (not shown) in order to create the desired vacuum within vacuum chamber 13 and crucible 24. An outlet 21 is provided as a vacuum outlet for pressure measurement.

Vacuum chamber mechanism 13 rests upon crucible structure 14, the weight of the ram and associated mechanism 12 and the vacuum chamber 13 rests upon the flanges 22 and 23 of the vacuum chamber 13 and the crucible chamber 14. Flange 22 of vacuum chamber 13 rests on flange 23 that extends outwardly from the crucible, designated as 24. Between the two flanges there is an electrical insulating gasket shown at 25 in Fig. 1. Gasket 25 serves to electrically insulate crucible mechanism 14 from the balance of the furnace in order to maintain a potential difference between the electrode (not shown) and the crucible 24.

Flange 23 of crucible 24 is formed with threaded receptacles 23a (Fig. 1) that receive lifting eyes (not shown) that facilitate lifting crucible 24 and associated mechanism from water jacket 26. The purpose of removing crucible 24 will be explained in more detail below.

Crucible mechanism 14 is provided with a water jacket 26 of greater volume than that of vacuum chamber 13 in that a greater amount of cooling is required around the crucible. Water jacket 26 of crucible mechanism 14 is provided with inlets as shown at 27 and outlets as shown at 28. Water chamber 26 is provided with a flange 29 which is in turn provided with grooves as shown at 30 in which there is provided a packing material (not shown) which prevents water leakage from between the flanges.

Crucible 24 is provided with a lower flange 31 which is in turn bolted to a removable bottom designated as 32. Bottom 32 is attached to electrical power connection 33 by means for threaded areas of the respective members as shown at 34. Power connection 33 projects into crucible mechanism 14 through an opening in water jacket 26 as shown at 36. Sealing mechanism 37 is positioned around power connection 33. Water leakage through area 36 of water chamber 26 is prevented by flanges 38 of sealing mechanism 37 which are bolted to the bottom of water jacket 26 at 39. Sealing device 37 contains grooves 40 that circumvent power connection 33 and receive packing that seals power connection 33 from possible water leakage. Set screws 41 hold power connector 33 rigidly in place. Power connection 33 receives an electricity-carrying cable at area 42.

Crucible 24, of the present embodiment, may be replaced with crucibles of similar or varying sizes. Also, the crucible may be conveniently removed after melting to remove the ingot therefrom. To remove the crucible, the ram and driving mechanism 12 together with vacuum chamber 13 are raised separating the crucibles between flanges 22 and 23. Water is drained from cooling jacket 26. Set screws 41 of sealing member 37 are loosened and the power attachment at 42 of power connection 33 is removed to permit vertical travel of power connection 33. The crucible 24 is lifted from water jacket 26 by means of lifting eyes (not shown) screwed into flanges 23 at 23a. Crucible bottom 32 and power connection 33 are removed intact with crucible 24. Power connection 33 may then be unscrewed from crucible bottom 32 and crucible bottom 32 removed from crucible flange 31 by removing retaining bolts 35.

In the operation of the furnace of the present embodiment it has been found advantageous to maintain a separate bottom plate 32 for each crucible. The power connection 33 is screwed into the bottom plate 32 which has been bolted to the crucible flange 31 by retaining bolts 35 of the crucible 24 next to be employed. The assembly is then lowered into the water jacket 26. The power connection 33 protrudes through the sealing device 37 to receive an electricity-carrying cable at area 42. Set screws 41 of sealing member 37 are tightened.

The ram and associated mechanism 12 are equipped with a pair of vertically extending and spaced ram supporting poles 43 carried on the cover 15 and connected at the upper ends thereof by a cross bar 43a to support drive screws 44 which, as will be explained in more detail, effect vertical travel of device 10 and also the vertical motion of ram 11.

In the general operation of a furnace of this type an electrode stub is welded to an electrode. The furnace areas 12 and 13 are raised and the electrode is inserted into the crucible 24. The stub is then connected to a connector or receptacle 45 carried on the end of ram 11. The electrode projects downwardly into the crucible to a predetermined distance from the bottom plate 32 or more accurately starting material 46 placed therein. Thus, it is obvious that the conventional furnace which does not have an adjustable ram can only be operated by effecting a combined length of electrode and electrode stub or pedestal that will effect the desired gap between starting material 46 and the electrode when the furnace is assembled for operation.

The electric power or potential opposing that of power connection 33 is supplied to the electrode through the ram. In the present embodiment the ram is water cooled. A copper tube as shown at 47 projects through a larger stainless steel member 48 that forms the outside of ram 11. Water is projected into tube 47 through rubber hose 49 (see particularly Fig. 2) where it flows to the bottom of tube 47 through open areas (not shown) and back up between tube 47 and the outer stainless steel shell 48 and out of outlet 50 near the top of the ram, the outlet 50 being normally connected to a suitable drain. Inasmuch as copper is a superior electrical conductor as opposed to steel, electrical power is supplied to the copper tube 47 although the stainless steel shell 48 obviously is also carrying the electrical potential. Should the outer cylinder 48 of the ram be made of a highly conductive metal such as copper it would be unnecessary to provide or supply the electrical potential to member 47 but the supply could be connected directly to the outside of the ram. It is desirable however since the ram carries the weight of the electrode to utilize the stronger outer stainless steel shell 48 as described. However, in the present embodiment the ram positioner and driving device 10 is provided with a plate 51 to which is bolted by means of bolts 52 (in particular see Fig. 4) flange 53 of copper plate 54. The power connection is made by way of bolts 52 to plate 54. Plate 54 is provided with a slot, shown at 55, to which there is slidably connected copper plate 56 through bolts 57. Plate 56 is bolted by means of sleeves 58 and bolts 58a to copper tube 47. Thus the ram 11 and associated mechanism may be adjusted vertically in accordance with the length of slot 55 limiting the vertical travel of bolts 57. Electric power flows from plate 54 through plate 56 and sleeves 58 to tube 47 and thus down the ram to the electrode.

As is particularly illustrated by Figs. 4, 5 and 6, device 10 is composed of a C-shaped sleeve 59 that fits around ram 11 and is provided with flanges 60. Each flange is provided with perforations through which there is projected bolt-like member 61. The head of bolt-like member 61, designated as 62, retains the member on one side of the flanges 60 and a threaded area of member 61 as shown at 63 projects through the opposite perforation. Member 61 is threaded into retaining nut 64. Nut 64 is provided with a lock washer 65 that precludes its rotation. A handle 66 is secured to the head of bolt-like member 61.

Sleeve 59 is attached to a driving member 67 by means of bolts 68 and a retaining plate 69. Driving member 67 contains threaded perforations as at 70 which are shown in Fig. 2 to be threaded to drive screws 44. As shown particularly by Figs. 4 and 6, sleeve 59 is formed with a supporting plate 71 attached by a neck 72 which supporting plate in turn supports plate 51 which serves as a mounting for power connection plate 54.

In the present embodiment drive screws 44 are driven by a motor 73 through a reducing gear as housed at 74 (note in particular Fig. 3). The gear housed at 74 rotates sprocket 75 which in turn drives chain 76 and sprockets 77 and 79 as well as idler sprocket 78, thus effecting rotation of drive screws 44. The vertical motion of device 10 is thus controlled by actuation of motor 73 which effects rotation of drive screws 44 which in turn effect vertical motion of device 10 upwards or downwards.

Movement of the handle 66 effects rotation of bolt-like member 61 which either draws flanges 60 together, drawing sleeve 59 tight against ram 11, or permits the expansion of sleeve 59 depending upon the direction of rotation. By rotating bolt-like member 61 in one direction the C-shaped sleeve 59 is tightened on the ram; thus, when rotation of drive screws 44 is effected, the ram travels with device 10. If bolt-like member 61 is rotated in the reverse direction, the C-shaped sleeve is loosened on ram 11 and device 10 will travel independently of the ram. Thus the ram 11 and the positioning and driving device 10 may be adjusted in respect to one another to permit electrodes of varying length to be employed.

It can be seen that when the ram and driving mechanism 12 and vacuum chamber 13 are lifted from crucible mechanism 14 and an electrode is attached to ram 11 by means of a standard sized stub or pedestal the exact length of the electrode is not important in that by rotation of handle 66 to loosen or tighten sleeve 59 on ram 11, the ram and/or driving device 10 may be adjusted to effect the desired clearance between the electrode and starting material 46. A vacuum may then be drawn on vacuum chamber 13 and crucible 24 through port 19 in a conventional manner. Water is circulated through the respective cooling jackets. An electric arc is struck between the electrode and material 46. The speed of motor 73 is set to uniformly advance the electrode a predetermined distance to effect vacuum remelting.

The above embodiment is given as an illustration of the device of the present invention, it being obvious that numerous modifications of the device may be employed and that the present invention is not to be limited to the exact structure or operation set forth. For example, the ram need not be cylindrical but may be of any elongated cross sectional shape. The term C-shaped clamp as used in the present application means a clamp surrounding the ram regardless of its contour. Also, in melting some metals a vacuum is not required so that provisions for a vacuum need not be included in these cases. Further, provisions may be made for melting in gaseous atmospheres other than air or a vacuum.

I claim:

1. In a consumable electrode melting furnace having a ram disposed to carry a metal electrode into a melting zone to be consumably melted therein, the combination comprising a ram positioning and driving member having a substantially C-shaped member as a part thereof, means for advancing and retracting said ram positioning and driving member in respect to the melting zone of said furnace, said substantially C-shaped member conforming to a cross sectional perimeter of said ram and being disposed around said ram, and means to loosen and tighten said C-shaped member around said ram so that said ram may be propelled with said ram positioning and driving member when said C-shaped member is tightened or said ram positioning and driving member may be propelled independently of said ram when said C-shaped member is loosened.

2. In a consumable electrode melting furnace having a ram disposed to carry a metal electrode into a melting zone to be consumably melted therein, the combination comprising, a ram positioning and driving member having at least one threaded screw receptacle open at both ends, a corresponding rotatable drive screw disposed in threaded engagement with said receptacle and disposed to be rotated to actuate said ram positioning and driving member towards said melting zone when said drive screw is rotated in one direction and away from said melting zone when the drive screw is rotated in a reverse direction, a clamping part comprising a substantially sleeve shaped member that conforms to the cross sectional perimeter of the ram disposed about said ram, means for tightening and loosening said sleeve shaped member so that said ram positioning and driving member may travel independently of said ram when said sleeve shaped member is loosened and will motivate said ram when said sleeve shaped member is tightened.

3. In a consumable electrode melting furnace having a ram disposed to carry a metal electrode into a melting zone to be consumably melted therein, the combination comprising a ram positioning and driving member having at least one threaded screw receptacle open at both ends, a corresponding rotatable drive screw disposed in threaded engagement with said receptacle and disposed to be rotated to actuate said ram positioning and driving member toward said melting zone when said drive screw is rotated in one direction and away from said melting zone when the drive screw is rotated in a reverse direction, a clamping part comprising a substantially C-shaped member that conforms to the cross sectional perimeter of the ram disposed about said ram, said substantially C-shaped member being formed with two flanges extending outwardly, one on either side of the open area of the C, said flanges each having a perforation, a bolt shaped member positioned as projected through the perforations of each flange across the open area of said C and threaded to a non-rotatable threaded retaining member so that rotation of the bolt shaped member in one direction tightens said C-shaped member on the ram and rotation in the reverse direction loosens said C-shaped member on the ram, and means to rotate said bolt shaped member.

4. In a consumable electrode melting furnace having a ram disposed to carry a metal electrode into a melting zone to be consumably melted therein, the combination comprising, a ram positioning and driving member having at least one threaded screw receptacle open at both ends, a corresponding rotatable drive screw disposed in threaded engagement with said receptacle and disposed to be rotated to actuate said ram positioning and driving member towards said melting zone when said drive screw is rotated in one direction and away from said melting zone when the drive screw is rotated in a reverse direction, a clamping part comprising a substantially C-shaped member that conforms to the cross sectional perimeter of the ram disposed about said ram, said substantially C-shaped member being formed with two flanges extending outwardly, one on either side of the open area of the C, said flanges each having a perforation, one of said perforations being formed with threads, a bolt shaped member positioned as projected through the perforation of the non-threaded flange across the open area of said C and threaded into the threaded area of the threaded perforation so that rotation of the bolt shaped member in one direction tightens said C-shaped member on the ram and rotation in the reverse direction loosens said C-shaped member on the ram and means to rotate said bolt shaped member.

5. In a consumable electrode melting furnace having a vertically positioned ram disposed to carry a metal electrode into a crucible to be consumably melted therein, the combination comprising, a ram positioning and driving member having a pair of vertically mounted threaded screw receptacles open at both ends, two vertically mounted rotatable drive screws disposed in threaded engagement with said receptacles and disposed to be rotated to actuate said ram positioning and driving member, a clamping part comprising a substantially C-shaped member that conforms to the cross sectional perimeter of the ram disposed about said ram, said substantially C-shaped member being formed with two flanges extending outwardly, one on either side of the open area of the C, said flanges each having a perforation, a bolt shaped member positioned as projected through the perforations of each flange across the open area of said C and threaded to a nut-like retaining member so as to confine the flange within the area of the head of the bolt-like member and the nut-like retaining member, said nut-like retaining member being non-rotatable, an outwardly projecting handle attached to the head of said bolt-like member so that movement of the handle effects rotation of said bolt-like member and causes a change in diameter of said substantially C-shaped member.

6. In a consumable electrode melting furnace having a vertically positioned ram disposed to carry a metal electrode into a crucible to be consumably melted therein, the combination comprising, a ram positioning and driving member having two vertically mounted threaded screw receptacles open at both ends, two vertically mounted rotatable drive screws disposed in threaded engagement with said receptacles and disposed to be rotated to actuate said ram positioning and driving member, a clamping part comprising a substantially C-shaped member that conforms to the cross sectional perimeter of the ram disposed about said ram, said substantially C-shaped member being formed with two flanges extending outwardly, one on either side of the open area of the C, each of said flanges being formed with a circular perforation, the circular perforation having a substantially common axis across the open area of the substantially C-shaped clamp, a bolt shaped member having a shank of a diameter that will pass through said circular perforations, a head that will not pass through said circular perforations and formed with threads at the end opposite the head is positioned as projected through said circular perforations in said flanges along said common axis and threaded to the threaded receptacle of a non-rotatable retaining member positioned against the flange that is opposite the head of the bolt shaped member and on the surface of the flange away from the open area of the substantially C-shaped member and means to rotate said bolt shaped member so that said clamping device may be tightened and loosened by rotation of said bolt shaped member.

7. In a consumable electrode melting furnace having a vertically positioned cylindrically shaped ram disposed to carry a metal electrode into a crucible to be consumably melted therein, the combination comprising, a ram positioning and driving member having two vertically mounted threaded screw receptacles open at both ends, two vertically mounted rotatable drive screws disposed in threaded engagement with said receptacles and disposed to be rotated to actuate said ram positioning and driving member, a clamping part comprising a sleeve shaped member disposed about said ram, said sleeve shaped member being formed with a void area running the length of the member and constituting an area less than one half the circumference thereof, said sleeve shaped member being further formed with two flanges projecting outwardly on either side of said void area, said flanges each possessing a circular perforation, said perforations having a substantially common axis across said void area, a bolt shaped member positioned as projected through the perforation of both flanges across said void area and threaded into the threaded receptacle of a nut-like retaining member positioned next to one of the flanges on the opposite side of said void area and opposing the head of said bolt shaped member, said nut-like retaining member being substantially non-rotatable and means for rotating said bolt-like member so that upon rotating of said bolt-like member in one direction the member will advance into the nut-like retaining member forcing the flanges toward one another reducing the void area and the diameter of the sleeve-like part causing a tight connection between said sleeve-like member and the furnace ram so that the ram will travel vertically with said ram positioning and driving member upon rotation of said drive screws, and when said bolt-like member is rotated in the reverse direction the member will retreat from the threaded retaining member causing the flanges to expand away from one another expanding the void area and the diameter of said sleeve-like member effecting a loose connection between the sleeve and the furnace ram so that the ram positioning and driving member, upon rotation of said drive screws, will slide over said ram.

References Cited in the file of this patent

UNITED STATES PATENTS

| | | |
|---|---|---|
| 601,268 | Krug | Mar. 29, 1898 |
| 688,649 | Kayser | Dec. 10, 1901 |
| 1,918,843 | Holmes | July 18, 1933 |
| 2,014,634 | Polgov | Sept. 17, 1935 |